(12) United States Patent
Di Palma et al.

(10) Patent No.: US 8,296,415 B2
(45) Date of Patent: Oct. 23, 2012

(54) WORKLOAD TIMING USING A SELF-ADAPTIVE APPROACH TO INFORMATION COLLECTION

(75) Inventors: Andrea Di Palma, Rome (IT); Paolo Ottaviano, Rome (IT); Caterina Perri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 11/935,651

(22) Filed: Nov. 6, 2007

(65) Prior Publication Data
US 2008/0140830 A1 Jun. 12, 2008

(30) Foreign Application Priority Data
Dec. 6, 2006 (EP) ..................................... 06125513

(51) Int. Cl.
*G06F 15/173* (2006.01)
*G06F 11/00* (2006.01)
*G01R 31/08* (2006.01)
*G08C 15/00* (2006.01)
*H04J 1/16* (2006.01)

(52) U.S. Cl. ............................. 709/224; 370/252; 714/39
(58) Field of Classification Search .................. 709/224; 714/39; 370/52
See application file for complete search history.

(56) References Cited

U.S. PATENT DOCUMENTS

| | | | |
|---|---|---|---|
| 6,314,463 B1* | 11/2001 | Abbott et al. | 709/224 |
| 2002/0065864 A1* | 5/2002 | Hartsell et al. | 709/100 |
| 2002/0152305 A1* | 10/2002 | Jackson et al. | 709/224 |
| 2004/0139434 A1* | 7/2004 | Blythe et al. | 718/100 |
| 2006/0259621 A1* | 11/2006 | Ranganathan et al. | 709/226 |

* cited by examiner

*Primary Examiner* — Haresh N Patel
*Assistant Examiner* — Lawrence Cosby
(74) *Attorney, Agent, or Firm* — Stephen J. Walder, Jr.; Jeffrey S. LaBaw

(57) ABSTRACT

A solution is proposed for implementing a self-adapting reconciliation process. Multiple user accounts are defined on different endpoints for accessing protected resources thereof; a server centralizes the definition of the user accounts on a single point of control which is then synchronized with user account definitions on the endpoints. A dynamic reconciliator, interposed between the server and the endpoints, receives any request from the server for a reconciliation process to be completed in a predefined time-frame. The reconciliator collects the required information from the endpoints and determines an optimal time pattern for the processing of the information by the server over the time-frame according to an estimated amount of information expected to be received and an estimated workload distribution of the server in the time-frame. The reconciliator transmits the information to the server according to this time pattern.

20 Claims, 5 Drawing Sheets

WORKLOAD TIMING USING A SELF-ADAPTIVE APPROACH TO INFORMATION COLLECTION

FIELD OF THE INVENTION

The present invention relates to the information technology field. More specifically, the invention relates to the collection of information (for example, for its synchronization in distributed data processing systems).

BACKGROUND ART

Data processing systems with distributed architecture have become increasingly popular in the last years (especially thanks to the dramatic improvements of networking techniques). In this context, a commonplace activity is the collection of information from local entities on a central entity of the system (for its processing); typically, this procedure is used to synchronize the information on the local entities with its consolidated version on the central entity.

A practical example of implementation of the above-mentioned procedure is in a security management application. In this case, the system includes different endpoints wherein multiple user accounts are defined; each user account controls an access to the corresponding endpoint by a user with a well-defined identity. The user accounts for all the endpoints are defined centrally on a server; the definition of the user accounts is then automatically propagated to all the relevant endpoints.

The security management application strongly simplifies the handling of the user accounts (since all the operations can be performed on a single console). This helps reducing errors and inconstancies typically caused by the use of multiple interfaces. Moreover, it is possible to leverage consolidated information about all the users of the system (for example, to drive initiative based on their identities). The above-mentioned advantages are clearly perceived in modern systems, which manage a huge number of users (up to some hundreds of thousands). An example of commercial security management application available on the market is the "IBM Tivoli Identity Manager (ITIM)" by IBM Corporation.

However, a problem of the security management applications known in the art is that the user accounts may also be created or updated directly on the endpoints; for example, this happens when native consoles are still used locally. Therefore, it is necessary to synchronize the definition of the user accounts on the endpoints with the one available on the server (with a process known as reconciliation); typically, the reconciliation process is performed periodically (for example, at the end of every week).

A drawback of this mechanism is that it causes an excessive workload on the server (wherein the whole processing of the collected information is localized). Particularly, in large systems with hundreds of endpoints each one managing thousands of user accounts the workload of the server may readily become untenable.

A solution known in the art for controlling the reconciliation process is of scheduling its start time on the different endpoints individually; at the same time, it is set a predefined time-frame for the completion of the reconciliation process (defining a time-out value for its maximum allowable duration). However, the scheduling of the reconciliation process is decidedly nontrivial (since it must be planned during inactivity windows of the server, in order to avoid disrupting its normal operation).

In any case, the duration of the reconciliation process is not easily predictable. Therefore, when the time available is not enough to complete the processing of the information provided by a specific endpoint, all the changes applied on the server must be rolled back; this undermines the reliability of the whole process.

A further drawback is due to the fact that all the user accounts defined on each endpoint are processed at every iteration of the reconciliation process. In this respect, it is possible to filter the user accounts to be synchronized (so as to perform a partial reconciliation thereof); however, in this case as well all the user accounts matching the filter criteria must be processed. Therefore, a high amount of information is always transmitted to the server (even when it is not necessary).

SUMMARY OF THE INVENTION

In its general terms, the present invention is based on the idea of applying a self-adaptive approach.

Particularly, the present invention provides a solution as set out in the independent claims. Advantageous embodiments of the invention are described in the dependent claims.

More specifically, an aspect of the invention provides a method for collecting information in a data processing system. The method starts with the step of providing a plurality of information items; the information items are provided by a plurality of source entities of the system for processing by a target entity of the system within a predefined time-frame. The method monitors the information items that were provided in previous time-frames. A total number of the information items expected to be provided in the time-frame is estimated according to the monitored information items. Likewise, the method monitors a processing capability of the target entity. A capability distribution of the processing capability of the target entity in the time-frame is estimated according to the monitored processing capability. It is then possible to determine a time pattern for the processing of the information items by the target entity in the time-frame—according to the total number and the capability distribution. The target entity is then caused to process the information items according to the time pattern.

In a preferred embodiment of the invention, the proposed process is controlled by an intermediate entity of the system (between the source entities and the target entity).

For this purpose, the information items from the different source entities are preferably gathered in a global queue.

Advantageously, each source entity provides a batch of information items, which is then split into the corresponding information items by the intermediate entity.

In this phase, it is also possible to discard each information item that is unchanged (with respect to a previous version thereof).

A way to further improve the solution is of correcting the time pattern according to a current number of the information items that have already been provided in the time-frame.

Preferably, the correction is applied only when the current number exceeds a residual number of the information items still expected to be processed.

A specific embodiment of the invention is based on a time-discrete approach (wherein a target number of the information items to be transmitted to the server is calculated for each time-slot of the time-frame).

In this case, the target number is corrected (when necessary) by increasing it according to the information items in excess.

Typically, the time-frame consists of a predefined deadline for completing the collection of the information items.

For example, the devised solution finds application in a reconciliation process.

A further aspect of the invention proposes a computer program for performing the above-described method.

A still further aspect of the invention proposes a service for performing the same method.

Another aspect of the invention proposes a corresponding system.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
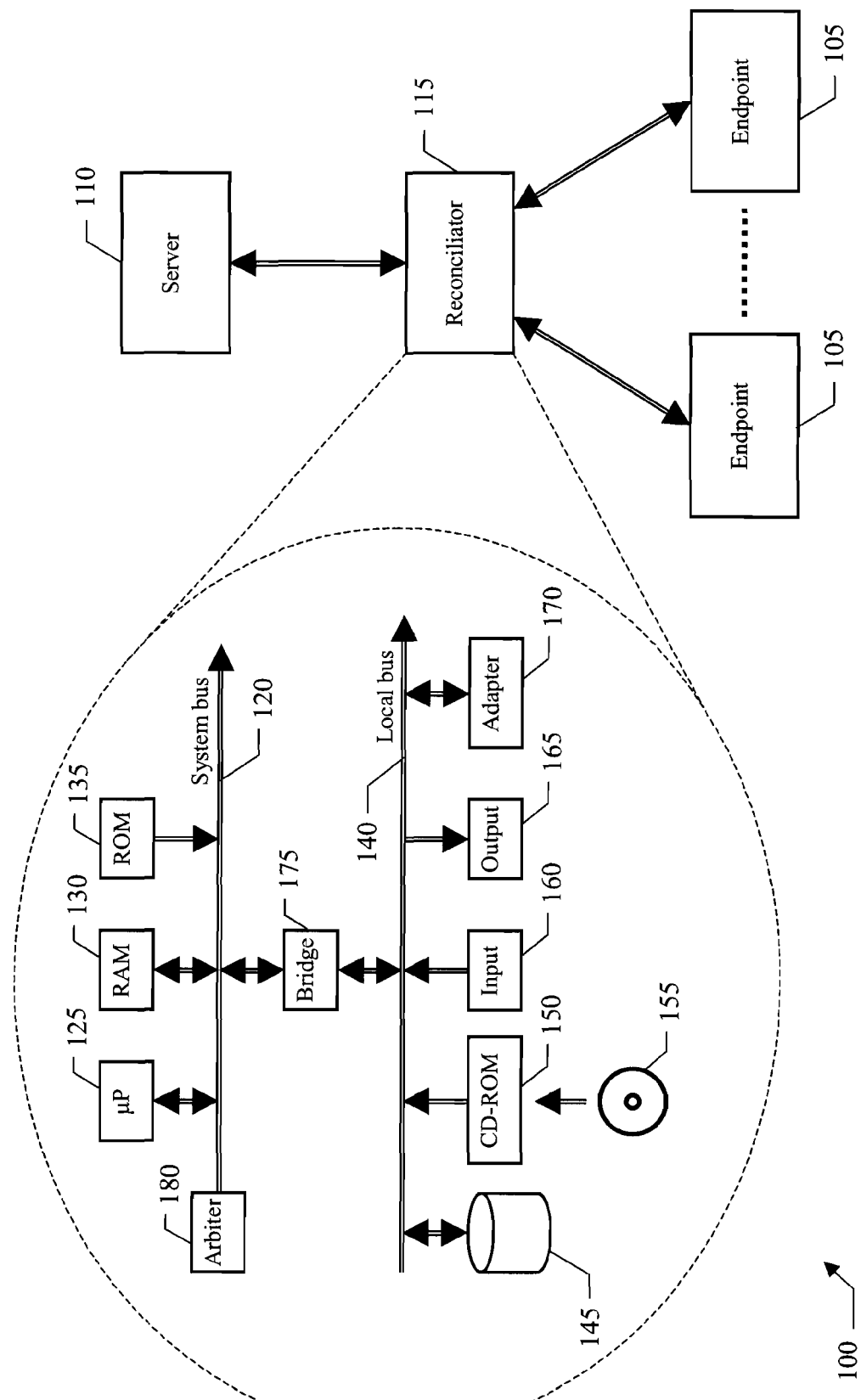
FIG. 1 is a schematic block diagram of a data processing system in which the solution according to an embodiment of the invention is applicable.

With reference in particular to FIG. 1, a data processing system 100 with distributed architecture is illustrated. The system 100 includes a plurality of local endpoints 105. Multiple users (such as employees, customers or suppliers) access each endpoint 105, either directly or through a network (not shown in the figure). For this purpose, each user is associated with a user account (typically identified by a unique username); the user account specifies an identity of the user, his/her access password, and any granted authorization (for performing specific operations on selected resources managed by the endpoint 105). For example, the user accounts allow accessing an operating system profile, a personal mail box, specific views of a database, and the like.

A central server 110 implements a single point of control for all the user accounts of the system 100. Particularly, the server 110 centralizes the definition of the user accounts on the different endpoints 105; for this purpose, each user is associated with a user profile, which is then mapped to the corresponding user accounts on the endpoints 105 s/he needs to access.

Nevertheless, the user accounts may also be updated directly on the endpoints 105. A typical example is the change of the passwords by the users; another example is the maintenance of the user accounts by local administrators through native consoles. In order to avoid any inconsistency, the (local) information defining the user accounts on the endpoints 105 must be synchronized with the (central) information consolidating the same definitions on the server 110 (during a reconciliation process).

The reconciliation process involves collecting the local information from the different endpoints 105 on the server 110; the (collected) local information is then processed by the server 110 so as to update the central information accordingly. The server 110 requires that the reconciliation process should be completed within a predefined time-frame. Typically, the local information is collected periodically from the different endpoints 105, and it must be processed on the server 110 by a specific deadline. For example, the reconciliation process is performed every week, with the requirement of completing it by Sunday night (for all the changes to the user accounts applied in the last week); in this way, it is possible to ensure that at the beginning of every week the central information on the server 110 is always synchronized with the local information on the endpoints 105.

As described in detail in the following, the solution according to an embodiment of the invention proposes a self-adaptive approach to the reconciliation process. For this purpose, there is estimated the amount of local information that is expected to be provided by the endpoints 105 during the time-frame (according to a series of preceding measurements thereof); likewise, there is estimated a distribution of the processing capability of the server 110 during the same time-frame (according to a series of further preceding measurements thereof). It is then possible to determine a time pattern for the processing of the local information by the server 110; the time pattern allocates the processing of the local information—as per its estimated amount—throughout the time-frame according to the estimated capability distribution of the server 110.

In this way, the processing of the local information on the server 110 is dynamically distributed during its normal working time, so as to prevent any peak of workload; as a result, it is possible to have no significant impact on the performance of the server 110.

At the same time, this guarantees the completion of the reconciliation process in the desired time-frame, with a beneficial effect on the reliability of the whole process.

For this purpose, in an embodiment of the invention a dynamic reconciliator 115 is interposed between the endpoints 105 and the server 110. As described in detail in the following, in this way the server 110 simply submits any reconciliation request to the reconciliator 115 (instead of to the endpoints 105). The reconciliator 115 takes care of forwarding the reconciliation request to the different endpoints 105 repeatedly. As a result, the reconciliator 115 receives the local information from the endpoints 105 continuously during the time-frame. The reconciliator 115 then modulates the transmission of the (received) local information to the server 105, so as to ensure the completion of the reconciliation process in time.

In this way, it is possible to implement a fair multiplexing policy (thereby avoiding any individual delay of the endpoints). It should be noted that the proposed architecture is substantially opaque to the server 105 and to the endpoints 110 (which can continue working as usual). Moreover, the choice of designing the reconciliator 115 as an independent component provides a high scalability of the system 100.

Typically, the reconciliator 115 is implemented by means of a computer being formed by several units that are connected in parallel to a system bus 120. In detail, one or more microprocessors (μP) 125 control operation of the reconciliator 115; a RAM 130 is directly used as a working memory by the microprocessors 125, and a ROM 135 stores basic code for a bootstrap of the reconciliator 115. Several peripheral units are clustered around a local bus 140 (by means of respective interfaces). Particularly, a mass memory consists of one or more hard-disks 145 and drives 150 for reading CD-ROMs 155. Moreover, the reconciliator 115 includes input units 160 (for example, a keyboard and a mouse), and output units 165 (for example, a monitor and a printer). A network adapter 170 is used to plug the reconciliator 115 into the system 100. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

With reference now to FIGS. 2a-2d, the proposed reconciliation process is preferably based on a time-discrete approach.

Figure 2A:
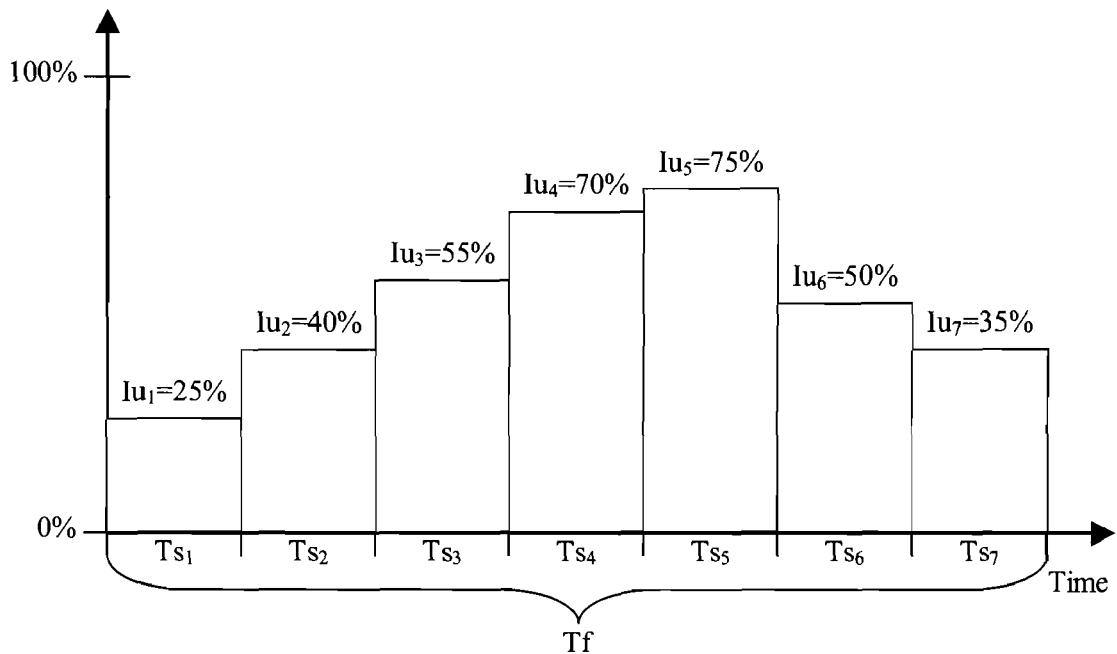
FIGS. 2a-2d illustrate an exemplary application of the solution according to an embodiment of the invention.

Particularly, as shown in FIG. 2a, the time-frame (denoted with Tf) is split into a plurality of time-slots $Ts_i$ (with i=1 ... N); in the example at issue, N=7 time-slots $Ts_i$ are illustrated (such as one per day in a time-frame Tf equal to a week).

The reconciliator calculates a sequence of usage indexes $Iu_i$, each one indicating a processing power usage of the server (i.e., its workload) in the corresponding time-slot $Ts_i$; the usage index $Iu_i$ consists of a normalized value, such as from 0% (when the server is idle) to 100% (when the server is completely busy). The usage index $Iu_i$ is typically set to the running average of historical values, which were measured for corresponding periods over a predefined observation time (for example, for the same day of the week in the last 6-12 months); each value may consist of the (normalized) cumulative number of processing units being used by the server during the period at issue. The figure shows an exemplary histogram of the usage indexes $Iu_i$, with the time on the axis of the abscissas (for the time-slots $Ts_i$) and the processing power on the axis of the ordinates (for the corresponding usage indexes $Iu_i$, each one represented by a bar).

Figure 2B:
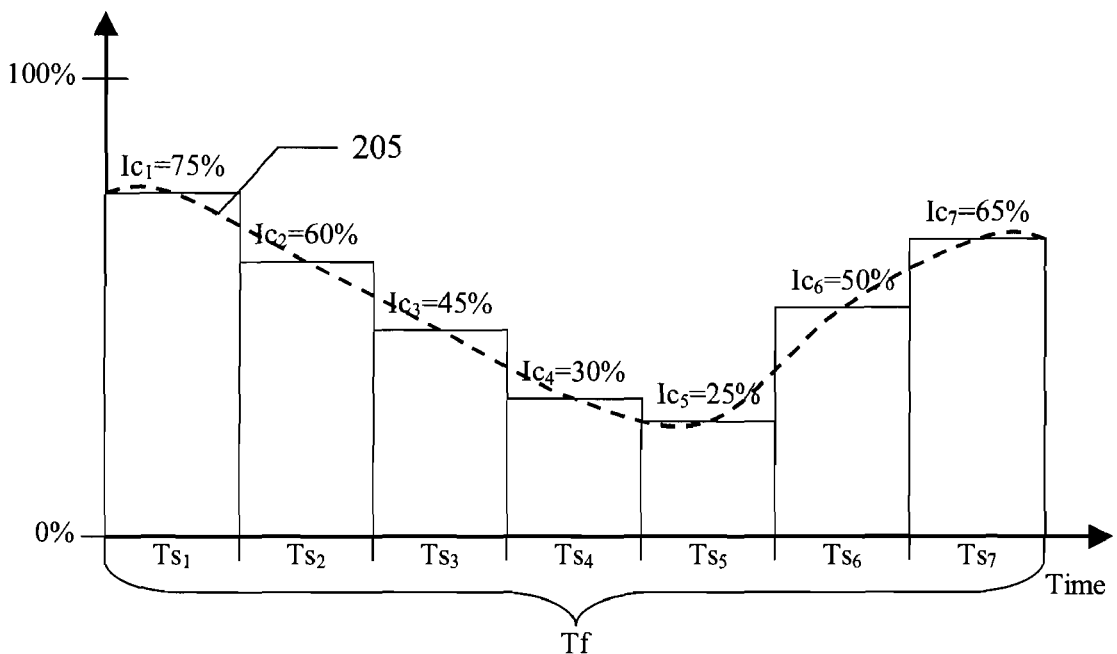

Moving to FIG. 2b, a capability index $Ic_i$ is calculated for each time-slot $Ts_i$; the capability index $Ic_i$ indicates a processing capability of the server (i.e., its free bandwidth) during the corresponding time-slot $Ts_i$ (from 0% when the server is unavailable to 100% when the server is completely free). The capability index $Ic_i$ is obtained by complementing the usage index $Iu_i$:

$$Ic_i = 100\% - Iu_i.$$

The sequence of capability indexes $Ic_i$ so obtained is fitted by a mathematical function, which is represented by a curve 205 in the figure; the fitting function is calculated by applying well-known error minimization algorithms (for example, of the least squares type). As can be seen, the fitting curve 205 smoothes any irregular changes observed on the server, thereby avoiding random errors due to wrong measures.

Figure 2C:
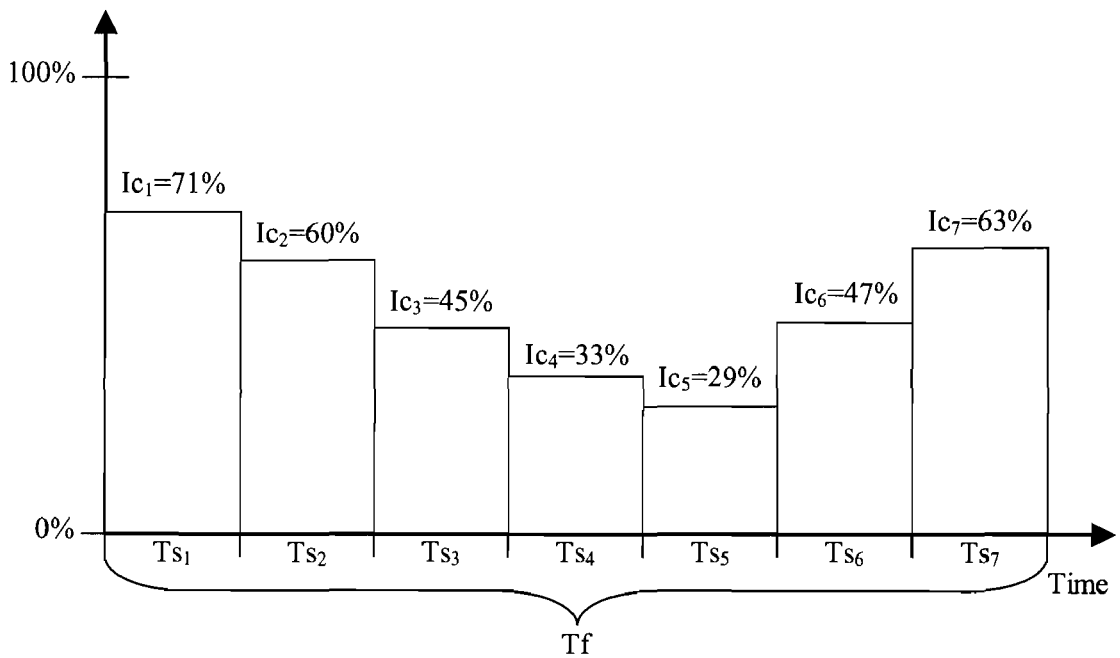

With reference now to FIG. 2c, the fitting function is converted back to discrete values so as to obtain again a different sequence of (smoothed) capability indexes $Ic_i$—which represents the distribution of the processing capability of the server in the time-frame Tf; for this purpose, each capability index $Ic_i$ is set to the integral of the fitting function over the corresponding time-slot $Ts_i$.

The reconciliator now calculates a total number Nt of basic information items (hereinafter referred to as jobs), which are expected to be received from the different endpoints during the time-frame Tf; as above, the total number Nt is typically set to the running average of historical values, which were measured for corresponding periods over the same observation time (i.e., every week in the last 6-12 months in the example at issue).

Figure 2D:
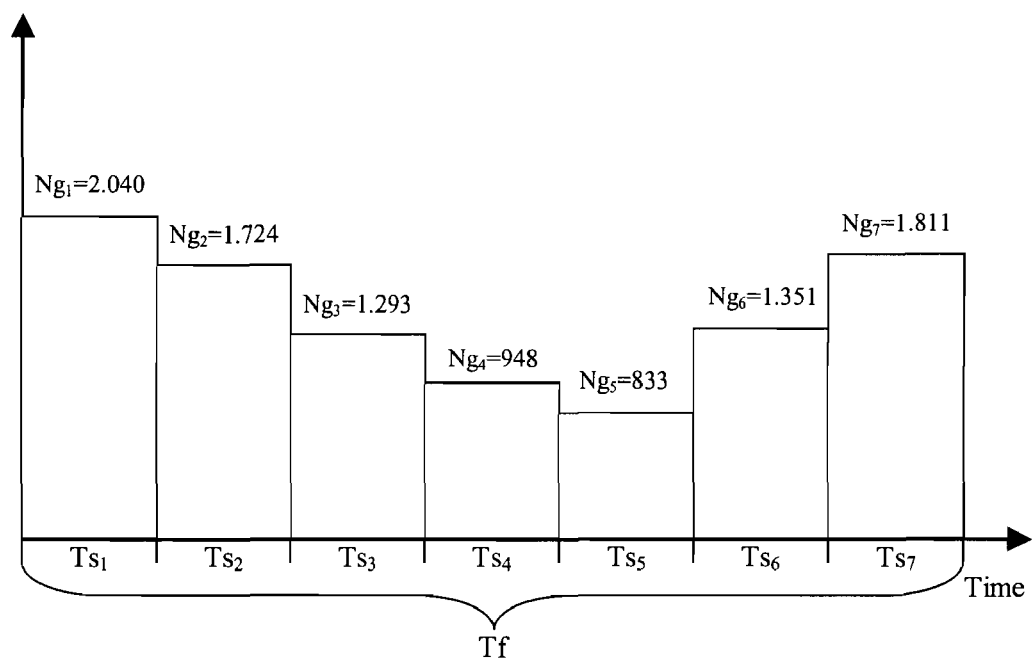

As shown in FIG. 2d, the total number Nt is distributed throughout the time-slots $Ts_i$—over the whole time-frame Tf—according to the capability distribution of the server (given by the sequence of the capability indexes $Ic_i$). For this purpose, there is calculated a target number $Ng_i$ of the jobs to be transmitted to the server in each time-slot $Ts_i$; more specifically, the target number $Ng_i$ is given by the formula:

$$Ng_i = \frac{Ic_i}{\sum_{h=1...N} Ic_h} \cdot Nt.$$

The sequence of target numbers $Ng_i$ so obtained defines the desired time pattern for the transmission of the jobs to the server (for their processing). For example, the figure illustrates the target numbers $Ng_i$ (for the capability distribution at issue) in the case of Nt=10,000.

The proposed algorithm is very simple, but at the same time effective.

It should be noted that the target numbers $Ng_i$ so obtained are based on forecast values (i.e., the total number Nt and the capability indexes $Ic_i$), which in practice may differ from the corresponding real values. Therefore, it is preferable to implement a recovery mechanism for correcting the target numbers $Ng_i$ in case of wrong estimates.

For this purpose, in a preferred embodiment of the invention the correction is based on the monitoring of a current number $Nc_i$ of the jobs that are present on the reconciliator at every time-slot $Ts_i$; the current number $Nc_i$ indicates the jobs that have been actually received from the endpoints, but that are still waiting to be transmitted to the server for their processing. Therefore, the current number $Nc_i$ is affected by any difference of the total number Nt and/or the capability indexes $Ic_i$ with respect to their actual values. Indeed, when more jobs are received than they were expected, the jobs in excess are not transmitted to the server so that they remain waiting on the reconciliator; the same result is achieved when the processing capability of the server is lower than it was expected, so that the server cannot process the desired jobs.

More in detail, before every time-slot $Ts_i$ the reconciliator calculates a residual number $Nr_i$ of the jobs that are still expected to be transmitted to the server:

$$Nr_i = Nt - \sum_{h=1...i} Ng_h.$$

It is then possible to calculate an excess number $Ne_i$ of the jobs actually present on the reconciliator at the time-slot $Ts_i$ with respect to the expected ones:

$$Ne_i = Nc_i - Nr_i.$$

Therefore, the excess number $Ne_i$ will be higher than zero whenever more jobs are received and/or the processing capability of the server is lower than expected. In this case, the target number $Ng_i$ for the next time-slots $Ts_i$ is increased accordingly, so as to ensure the correct processing of all the jobs in the desired time-frame Tf (irrespectively of the higher number of the jobs and/or the reduced processing capability of the server). For this purpose, the reconciliator calculates a correction value $Vc_i$ for the target number $Ng_i$ of the (next) time-slot $Ts_i$; the correction value $Vc_i$ is obtained by distributing the excess number $Ne_i$ throughout the (remaining) time-slots $Ts_i$—always according to the capability distribution of the server:

$$Vc_i = \frac{Ic_i}{\sum_{h=i+1...N} Ic_h} \cdot Ne_i.$$

The target number $Ng_i$ is then increased accordingly:

$$Ng_i = Ng_i + Vc_i.$$

As a result, the reconciliator automatically reshapes the time pattern for the transmission of the jobs to the server (so as to ensure their correct processing). As pointed out above, this may happen when the received jobs increase (for example, because of a burst of jobs). Moreover, this may also happen when the processing capability of the server decreases; particularly, this also takes into account the processing power of the server that is consumed by the reconciliation process.

Conversely, no action is instead performed when the excess number $Ne_i$ is lower than zero—meaning that less jobs are received than expected (being the processing capability of the server immaterial in this case). Therefore, the jobs continue to be transmitted to the server for their processing according to the (original) time pattern. Indeed, any reduction of the target number $Ng_i$ has no significant advantages; conversely, it might cause problems should the (missing) jobs be provided by the endpoints later on (as it is likely to happen) or should the processing capability of the server decrease for whatever reason.

Figure 3A:
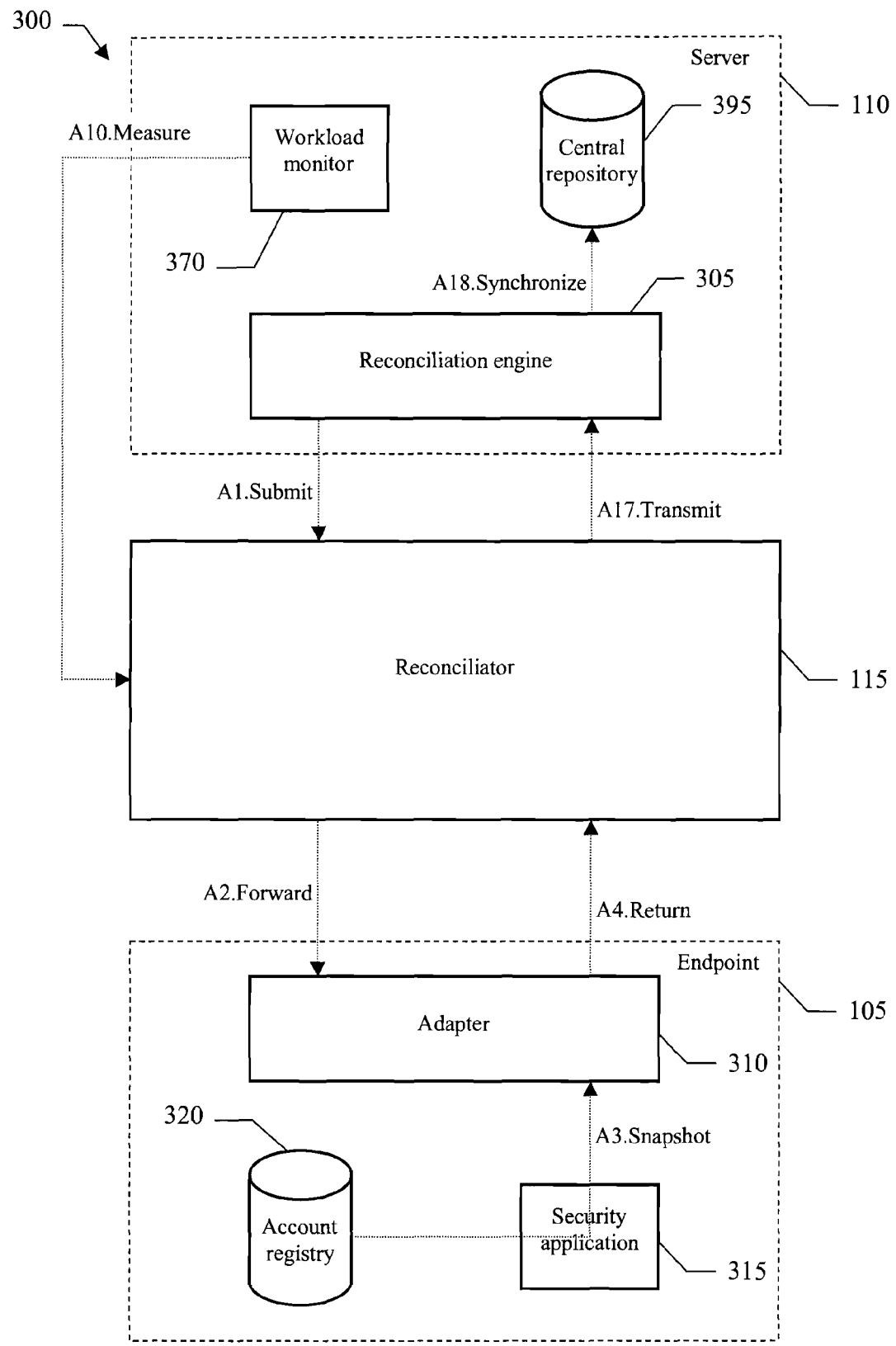
FIGS. 3a-3b show different levels of detail of a collaboration diagram representing the roles of software modules implementing the solution according to an embodiment of the invention.
Figure 3B:
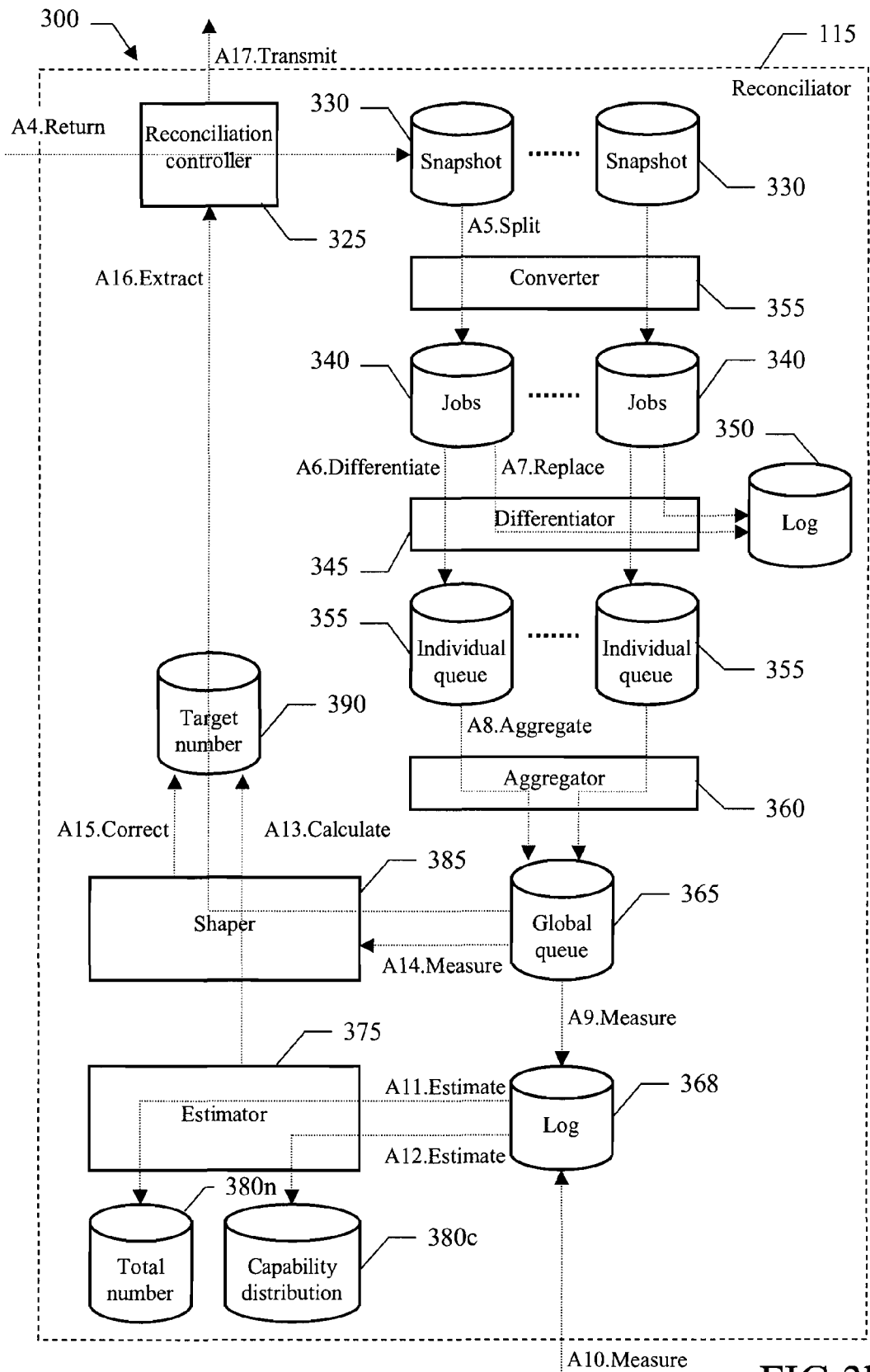

Considering now FIGS. 3a-3b, the main software modules that run on the reconciliator are denoted as a whole with the reference 300. The information (programs and data) is typically stored on the hard-disk and loaded (at least partially) into the working memory of the reconciliator when the programs are running. The programs are initially installed onto the hard disk, for example, from CD-ROM. Particularly, the figure describes the static structure of the system (by means of the corresponding modules) and its dynamic behavior (by means of a series of exchanged messages, each one representing a corresponding action denoted with sequence numbers preceded by the symbol "A").

Particularly, as shown in FIG. 3a, a reconciliation engine 305 controls the reconciliation process on the server 110; for this purpose, the reconciliation engine 305 submits a reconciliation request to the reconciliator 115 at the beginning of every time-frame Tf, i.e., at the beginning of every week in the example at issue (action "A1.Submit"). The reconciliator 115 forwards the reconciliation request to the different endpoints 105 with a higher frequency (action "A2.Forward"); preferably, this operation is performed more times during every time-slot $Ts_i$ (for example, 10-30 times—such as every hour in the example at issue).

The reconciliation request is received on each endpoint 105 (only one shown in the figure) by an adapter 310. The adapter 310 consists of an agent (running in the background), which interfaces with a security application 315 (or more) being installed on the endpoint 105; the security application 315 controls the access to protected resources of the endpoint 105 (such as files, web pages, e-mails, databases, and the like). For this purpose, the security application 315 owns an account registry 320, which stores the definition of the user accounts of all the users that are authorized to access the protected resources of the endpoint 105. Practical examples of the security application 315 are an operating system, an e-mail server, a database server, and the like (such as the "Lotus Domino" and the "DB2 UDB" by IBM Corporation) In response to every reconciliation request, the adapter 310 collects a snapshot of the account registry 320, including the current definition of all the user accounts of the endpoint 105 (Action "A3.Snapshot"). This snapshot (typically in the form of a file in the XML format) is then returned to the reconciliator 115 (action "A4.Return").

Moving to FIG. 3b, a reconciliation controller 325 on the reconciliator 115 receives the snapshots from the different endpoints (denoted with 330). A converter 335 splits each snapshot 330 into its jobs, each one consisting of the information defining a single user account (action "A5.Split"). For each endpoint, the corresponding jobs (denoted with 340) are supplied to a differentiator 345. The differentiator 345 compares the jobs 340 being just received with a previous version thereof stored in a log 350. This generates a reduced set of jobs relating to the user accounts that actually changed since a last iteration of the procedure (while the other jobs relating to the unchanged user accounts are discarded); the jobs so obtained are inserted into an individual queue 355 (action "A6.Differentiate"). At the same time, the jobs 340 are saved into the log 350 by replacing their previous version (action "A7.Replace") In this way, the amount of information to be processed by the server during the reconciliation process is strongly reduced (since the jobs are transmitted to the server only when it is necessary).

An aggregator 360 combines the jobs from the different individual queues 355 into a global queue 365 (action "A8.Aggregate"). Particularly, the jobs are gathered into the global queue 365 according to their collection time (defined by the corresponding reconciliation request, which indicates when the information was requested to the endpoints); this ensures that the jobs will be processed on the server in the correct temporal order (so as to avoid any inconsistency in the reconciliation process—for example, when some endpoints send their snapshots with a lower frequency). For the same collection time, the jobs are inserted into the global queue 365 according to a round-robin policy—so as to ensure their fair multiplexing.

The number of jobs that are added to the global queue 365 is measured every time-frame Tf; this value (indicating the received jobs to be processed) is added to a log 368 (action "A9.Measure"). At the same time (see FIG. 3a), a workload monitor 370 continuously measures the number of processing units that are used by the server 110; returning to FIG. 3b, the cumulative value being measured in every time-slot $Ts_i$ (indicating the processing power usage of the server) is added to the log 368 as well (action "A10.Measure").

An estimator 375 calculates the total number Nt (of jobs expected to be received from the different endpoints during the time-frame Tf) from the corresponding historical values stored in the log 368; the total number Nt is saved into a corresponding table 380n (action "A11.Estimate"). Likewise, the estimator 375 calculates the sequence of the (smoothed) capability indexes $Ic_i$ (defining the capability distribution of the server over the time-frame Tf) from the corresponding historical values stored in the log 368; the sequence of the capability indexes $Ic_i$ is saved into a corresponding table 380c (action "A12.Estimate").

At every time-slot $Ts_i$, a shaper 385 calculates the target number $Ng_i$ (indicating the jobs to be transmitted to the server) according to the total number Nt (from the table 380n) and the sequence of the capability indexes $Ic_i$ (from the table 380c); the target number $Ng_i$ is saved into a corresponding table 390 (action "A13.Calculate"). Moreover, the shaper 385 also measures the current number $Nc_i$ of the jobs that are present in the global queue 365—indicating the jobs that have been received but are still waiting to be transmitted to the server for their processing (action "A14.Measure"). The target number $Ng_i$ (in the table 390) is then corrected when the current number $Nc_i$ exceeds the residual number $Nr_i$ (of the jobs still expected)—being calculated from the total number Nt and the sequence of the capability indexes $Ic_i$ (action "A15.Correct").

The reconciliation controller 325 extracts the target number $Ng_i$ of the jobs from the global queue 365 during the time-slot $Ts_i$ (action "A16.Extract"). As shown in FIG. 3a, these jobs are then transmitted to the server 110 (action "A17.Transmit"). The jobs are received by the reconciliation engine 305; the reconciliation engine 305 accordingly updates a central repository 395—storing a consolidated version of the information defining the user accounts of the different endpoints 105—so as to ensure their synchronization (action "A18.Synchronize).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the system has a different structure or includes equivalent source entities (for providing the information) and/or an equivalent target entity (for processing it). Likewise, the numerical examples described above for the time-frame are merely illustrative, and must not be interpreted in a limitative manner. Moreover, different parameters may be used to define the processing capability of the server (such as its response time).

Alternatively, the total number (of the jobs expected to be received) and/or the capability distribution (of the server) can be estimated by applying different algorithms (even without any smoothing). On the other hand, in more sophisticated embodiments it is possible to apply classification techniques (for example, based on decision trees) or stochastic techniques (for example, based on a normal Poisson variable for the total number and a sequence of Gaussian variables for the capability distribution).

Likewise, any other algorithm may be used to calculate the desired time pattern (for the processing of the jobs by the server); for example, nothing prevents supporting particular time constraints for the reconciliation process (such as relegating the transmission of the jobs to the server to particular hours of the day—usually overnight—and/or to particular days of the week—usually over the weekend). In any case, all the parameters controlling the reconciliation process may be configurable (for example, by means of a profile file).

Similar considerations apply if the reconciliator is replaced with an equivalent intermediate entity (between the server and the endpoints). Anyway, this component is not strictly necessary and it may be omitted in a simplified implementation of the invention. For example, it would be possible to distribute the proposed algorithm on the different endpoints directly; alternatively, it is also possible to transmit the information continuously to the server, and to control its processing according to the desired time pattern directly on it.

The global queue on the reconciliator may be replaced with any equivalent structure (not necessarily consisting of a physical component); moreover, any other algorithm may be used to gather the jobs into the global queue (for example, based on priority policies).

It should be readily apparent that the information may also be provided directly in the form of a sequence of jobs by the endpoints (without the need of any splitting operation on the reconciliator).

In addition, the reconciliator may also consolidate consecutive changes to the same user account into a single job (thereby further reducing the amount of information to be processed by the server); anyway, nothing prevents always transmitting all the jobs to the server.

Alternatively, different algorithms may be applied to correct the time pattern (for example, by taking into account the actual workload of the server as well); however, this feature is not essential, and it may be omitted in a simplified implementation of the invention.

It should be readily apparent that the numerical examples described above for the time-slots are merely illustrative, and they must not be interpreted in a limitative manner; anyway, an embodiment of the invention based on a time-continuos approach is contemplated.

A general variant of the invention also provides the completion of the reconciliation process for every user account within a predefined period of time starting from its change on the endpoint (such as within a week); in this case, it would be possible to create a real multiplexing mechanism of the information provided by the different endpoints (with no longer the need of receiving it with a high frequency on the reconciliator).

Similar considerations apply if the proposed solution is implemented in a different security management application. Anyway, the same solution lends itself to be applied to synchronize whatever type of information items (for example, in a monitoring application); more generally, the information collected on the server may be processed in any other way (for example, for reporting purposes).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing device, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

Even though in the preceding description reference has been made to a physical reconciliator, this is not to be intended as a limitation. Indeed, in a different embodiment of the invention the same solution may be deployed by means of a service, which is offered by a corresponding provider.

Alternatively, the proposed method may be implemented on a computer with a different architecture or that includes equivalent units (such as cache memories temporarily storing the programs or parts thereof to reduce the accesses to the mass memory during execution); more generally, it is possible to replace the computer with any code execution entity (such as a PDA, a mobile phone, and the like).

The invention claimed is:

1. A method for collecting information in a data processing system, the method comprising:

providing a plurality of information items, the information items being provided by a plurality of source entities of the system for processing by a target entity of the system within a predefined time-frame;

wherein the timeframe comprising of a predefined deadline for completing the collection, the target entities providing the information items repeatedly during the time-frame;

monitoring the information items being provided in previous time-frames;

estimating a total number of the information items expected to be provided in the predetermined time-frame according to monitored information items provided in one or more of the previous time-frames corresponding to the predefined time-frame;

monitoring a processing capability of the target entity during the previous time-frames;

estimating a distribution of the processing capability of the target entity in the predefined time-frame according to the monitored processing capability of the target entity during one or more of the previous time frames corresponding to the predefined time-frame;

determining a time pattern for the processing of the information items by the target entity in the predefined time-frame according to the total number of the information items expected to be provided in the time-frame and the distribution of the processing capability of the target entity in the time-frame; and causing the target entity to process the information items according to the time pattern.

2. The method according to claim 1, wherein providing the information items comprises:

receiving the information items from the source entities on an intermediate entity of the system; and wherein causing the target entity to process the information items comprises:

transmitting the information items from the intermediate entity to the target entity according to the time pattern, wherein the source entities are endpoint devices, the target entity is a server for centralized reconciliation of user account information for the source entities, and wherein the information items are local user account information items local to the endpoint devices.

3. The method according to claim 2, wherein receiving the information items comprises:

gathering the information items in a global queue for transmission to the target entity.

4. The method according to claim 3, wherein receiving the information items comprises:

receiving a batch of information items from each source entity, and splitting each batch into the corresponding information items.

5. The method according to claim 4, wherein splitting each batch into corresponding information items comprises:

discarding each information item of the batch being unchanged with respect to a previous batch being received previously from the same source entity, wherein the discarded information items are not part of the information items transmitted from the intermediate entity to the target entity according to the time pattern.

6. The method according to claim 1, further comprising:

monitoring a current number of the information items being already provided in the time-frame; and correcting the time pattern according to the current number of information items already being provided in the time frame.

7. The method according to claim 6, wherein monitoring comprises:

detecting an excess condition wherein the current number of information items already being provided in the time frame exceeds a residual number equal to the difference between the total number and a processed number of the information items being already caused to be processed, the time pattern being corrected in response to the detection of the excess condition according to an excess number of the current number with respect to the residual number.

8. The method according to claim 7, wherein the time-frame is split into a plurality of time-slots, and wherein, for each time-slot, calculating the time pattern comprises:

calculating a target number of the information items to be processed by the target entity in the time-slot, the target number being calculated by distributing the total number throughout the time-slots according to the capability distribution, and wherein causing the target entity to process the information items comprises causing the target entity to process the target number of the information items in the time-slot.

9. The method according to claim 8, wherein, for each time-slot, correcting the time pattern comprises:

increasing the total number by a correction value, the correction value being calculated by distributing the excess number throughout the remaining time-slots according to the capability distribution.

10. The method according to claim 1, wherein the information items are indicative of user accounts managed by the source entities, the central entity storing a central repository with a consolidated version of the information items, and wherein the processing of the information items is a reconciliation of the central repository with the information items provided by the source entities.

11. A system for collecting information in a data processing system, the system comprising:

a processor; and a memory coupled to the processor, wherein the memory comprises instructions which, when executed by the processor, causes the processor to:

provide a plurality of information items, the information items being provided by a plurality of source entities of the system for processing by a target entity of the system within a predefined time-frame;

wherein the time-frame comprising of a predefined deadline for completing the collection, the target entities providing the information items repeatedly during the time-frame;

monitoring the information items being provided in previous time-frames;

estimating a total number of the information items expected to be provided in the predetermined time-frame according to monitored information items provided in one or more of the previous time-frames corresponding to the predefined time-frame;

monitoring a processing capability of the target entity during the previous time-frames;

estimating a distribution of the processing capability of the target entity in the predefined time-frame according to the monitored processing capability of the target entity during one or more of the previous time frames corresponding to the predefined time-frame;

determining a time pattern for the processing of the information items by the target entity in the predefined time-frame according to the total number of the information items expected to be provided in the time-frame and the distribution of the processing capability of the target entity in the time-frame; and causing the target entity to process the information items according to the time pattern.

12. The system according to claim 11, wherein the instructions cause the processor to provide the information items by:
receiving the information items from the source entities on an intermediate entity of the system; and
transmitting the information items from the intermediate entity to the target entity according to the time pattern, wherein the source entities are endpoint devices, the target entity is a server for centralized reconciliation of user account information for the source entities, and wherein the information items are local user account information items local to the endpoint devices.

13. The system according to claim 12, wherein the instructions cause the processor to receive the information items by:
gathering the information items in a global queue for transmission to the target entity.

14. The system according to claim 13, wherein the instructions cause the processor to receive the information items by:
receiving a batch of information items from each source entity, and
splitting each batch into the corresponding information items.

15. The system according to claim 11, wherein the instructions further cause the processor to:
monitor a current number of the information items being already provided in the time-frame; and
correct the time pattern according to the current number of information items already being provided in the time frame.

16. The system according to claim 15, wherein the instructions cause the processor to monitor the current number of information items being already provided in the time-frame by:
detecting an excess condition wherein the current number exceeds a residual number equal to the difference between the total number and a processed number of the information items being already caused to be processed, the time pattern being corrected in response to the detection of the excess condition according to an excess number of the current number with respect to the residual number.

17. The system according to claim 16, wherein the time-frame is split into a plurality of time-slots, and wherein, for each time-slot, the instructions cause the processor to calculate the time pattern by:
calculating a target number of the information items to be processed by the target entity in the time-slot, the target number being calculated by distributing the total number throughout the time-slots according to the capability distribution, and wherein causing the target entity to process the information items comprises causing the target entity to process the target number of the information items in the time-slot.

18. The system according to claim 17, wherein, for each time-slot, the instructions cause the processor to correct the time pattern by:
increasing the total number by a correction value, the correction value being calculated by distributing the excess number throughout the remaining time-slots according to the capability distribution.

19. The system according to claim 11, wherein the information items are indicative of user accounts managed by the source entities, the central entity storing a central repository with a consolidated version of the information items, and wherein the processing of the information items is a reconciliation of the central repository with the information items provided by the source entities.

20. A computer program product, in a non-transitory computer readable-medium having a computer readable program, wherein the computer readable program, when executed by a computing device, causes the computing device to:
provide a plurality of information items, the information items being provided by a plurality of source entities of the system for processing by a target entity of the system within a predefined time-frame;
wherein the timeframe comprising of a predefined deadline for completing the collection, the target entities providing the information items repeatedly during the time-frame;
monitoring the information items being provided in previous time-frames;
estimating a total number of the information items expected to be provided in the predetermined time-frame according to monitored information items provided in one or more of the previous time-frames corresponding to the predefined time-frame;
monitoring a processing capability of the target entity during the previous time-frames;
estimating a distribution of the processing capability of the target entity in the predefined time-frame according to the monitored processing capability of the target entity during one or more of the previous time frames corresponding to the predefined time-frame;
determining a time pattern for the processing of the information items by the target entity in the predefined time-frame according to the total number of the information items expected to be provided in the time-frame and the distribution of the processing capability of the target entity in the time-frame; and
causing the target entity to process the information items according to the time pattern.

* * * * *